(12) United States Patent
Hirth et al.

(10) Patent No.: US 9,316,134 B2
(45) Date of Patent: Apr. 19, 2016

(54) SUPPORTING PIN FOR AN ELECTRICALLY HEATABLE HONEYCOMB BODY

(71) Applicant: EMITEC GESELLSCHAFT FUER EMISSIONSTECHNOLOGIE MBH, Lohmar (DE)

(72) Inventors: Peter Hirth, Roesrath (DE); Jan Hodgson, Troisdorf (DE); Peter Bauer, Siegburg (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 121 days.

(21) Appl. No.: 14/302,611

(22) Filed: Jun. 12, 2014

(65) Prior Publication Data

US 2014/0290229 A1    Oct. 2, 2014

Related U.S. Application Data

(63) Continuation of application No. PCT/EP2012/075061, filed on Dec. 11, 2012.

(30) Foreign Application Priority Data

Dec. 12, 2011 (DE) .......................... 10 2011 120 720

(51) Int. Cl.
| | |
|---|---|
| *F01N 3/027* | (2006.01) |
| *F01N 3/10* | (2006.01) |
| *F01N 3/20* | (2006.01) |
| *F01N 3/28* | (2006.01) |
| *F01N 13/00* | (2010.01) |

(52) U.S. Cl.
CPC .............. *F01N 3/027* (2013.01); *F01N 3/2013* (2013.01); *F01N 3/2026* (2013.01); *F01N 3/281* (2013.01); *F01N 13/0097* (2014.06); *F01N 2330/02* (2013.01); *Y02T 10/26* (2013.01)

(58) Field of Classification Search
None
See application file for complete search history.

(56) References Cited

U.S. PATENT DOCUMENTS

| | | | |
|---|---|---|---|
| 5,413,767 A | 5/1995 | Breuer et al. | |
| 5,525,309 A | 6/1996 | Breuer et al. | |

(Continued)

FOREIGN PATENT DOCUMENTS

| | | |
|---|---|---|
| DE | 9317050 U1 | 3/1995 |
| DE | 102007025417 A1 | 12/2008 |

(Continued)

*Primary Examiner* — Walter D Griffin
*Assistant Examiner* — Jelitza Perez
(74) *Attorney, Agent, or Firm* — Laurence A. Greenberg; Werner H. Stemer; Ralph E. Locher

(57) ABSTRACT

A supporting pin for supporting an electrically heatable honeycomb body on a first honeycomb body includes a first end region, a second end region, an intermediate region, a core made of electrically non-conductive ceramic material and a metalized surface on at least one end region. The intermediate region is electrically non-conductive and has a length of at least 3 mm, preferably 5 to 15 mm. The supporting pin is particularly suitable for stabilizing electrically heatable honeycomb bodies in exhaust gas treatment systems for internal combustion engines, particularly for motor vehicles. When higher electrical voltages, such as 48 V, are used for electrically heatable honeycomb bodies, good electrical isolation is also assured in exhaust gas systems carrying soot particles with simultaneous safe support and suppression of vibrations.

10 Claims, 3 Drawing Sheets

(56) References Cited

U.S. PATENT DOCUMENTS

| | | |
|---|---|---|
| 5,768,889 A | 6/1998 | Maus et al. |
| 7,055,314 B2 | 6/2006 | Treiber |
| 8,012,440 B2 | 9/2011 | Hodgson et al. |
| 8,164,034 B2 | 4/2012 | Konieczny et al. |
| 2011/0158870 A1* | 6/2011 | Hodgson ............... F01N 3/2026 423/210 |

FOREIGN PATENT DOCUMENTS

| | | |
|---|---|---|
| DE | 102008035561 A1 | 2/2010 |
| DE | 10055447 B4 | 11/2010 |
| JP | H09220481 A | 8/1997 |
| WO | 9213636 A1 | 8/1992 |
| WO | 9610127 A1 | 4/1996 |
| WO | 03038247 A1 | 5/2003 |

* cited by examiner

SUPPORTING PIN FOR AN ELECTRICALLY HEATABLE HONEYCOMB BODY

CROSS-REFERENCE TO RELATED APPLICATION

This is a continuation, under 35 U.S.C. §120, of copending International Application No. PCT/EP2012/075061, filed Dec. 11, 2012, which designated the United States; this application also claims the priority, under 35 U.S.C. §119, of German Patent Application DE 10 2011 120 720.5, filed Dec. 12, 2011; the prior applications are herewith incorporated by reference in their entirety.

BACKGROUND OF THE INVENTION

Field of the Invention

The present invention relates to a supporting pin for an electrically heatable honeycomb body. Electrically heatable honeycomb bodies are used, in particular, as components in exhaust gas treatment systems of internal combustion engines. Exhaust gas purification systems of internal combustion engines, in particular in motor vehicles, contain filters and/or catalytically active elements, the temperature of which can be influenced by electrically heatable honeycomb bodies. The mechanically stable, yet electrically insulating mounting of electrically heatable honeycomb bodies represents a technical challenge.

The principle of supporting an electrically heatable honeycomb body on an adjacent first honeycomb body is known from International Publication No. WO 96/10127, corresponding to U.S. Pat. No. 5,768,889. The described configuration ensures a reliable, low-vibration configuration with constant electrically insulating distances.

A particular construction of an electrically insulating connection element suitable for electrically heatable honeycomb bodies is known from German Patent DE 100 55 447 B4. The supporting pin described therein contains a metal core, which is held in an electrically insulated manner. The production of that pin is relatively complex, and the maximum achievable distance between points with potentially different electric potential is relatively short.

SUMMARY OF THE INVENTION

It is accordingly an object of the invention to provide a supporting pin for an electrically heatable honeycomb body, which overcomes the hereinafore-mentioned disadvantages of the heretofore-known pins of this general type and which enables a good holding potential and reliable electrical insulation, even with the use of higher electric voltages to heat an electrically heatable honeycomb body. In particular, the pins are to be suitable for voltages of 24 V [volts], 36 V, 48 V or higher.

With the foregoing and other objects in view there is provided, in accordance with the invention, a supporting pin for supporting an electrically heatable honeycomb body on a first honeycomb body, the supporting pin comprising a first end region, a second end region and an intermediate region. The supporting pin has a core made of electrically non-conductive ceramic material, a metalized surface on at least one end region and an electrically non-conductive intermediate region with a length of at least 3 mm (millimeters), preferably at least 5 mm and, in particular, up to 15 mm at most.

It has been found in tests that modern industrial ceramics withstand high mechanical loads even under bending or shearing forces and are also suitable for the temperature conditions in exhaust gas purification systems and the other conditions prevailing there. Whereas known supporting systems based on metal cores cannot be easily electrically insulated for voltages such as 48 V, that problem can be overcome much better with a ceramic core and sufficient distance between electrically conductive parts at different potential.

An end region having a metalized surface is particularly suitable for fastening a supporting pin according to the invention on a metal honeycomb body. Such an end region can be fixedly connected to a metal honeycomb body, for example by brazing. The length of the intermediate region is dependent on the electric voltage used to heat the electrically heatable honeycomb body and should be at least 3 mm. Depending on the operating conditions, much greater lengths of the intermediate region may be expedient, for example if soot deposits are to be expected or also if moisture may develop before the start of the heating.

In accordance with another preferred feature of the invention, both end regions of the supporting pin are metalized, in such a way that the supporting pin can be brazed at both ends into metal honeycomb bodies.

In accordance with a further feature of the invention, the first end region has a smaller cross-sectional area than the cross-sectional area of the second end region. The first end region and the second end region thus have different cross-sectional areas, making the use of two honeycomb bodies having different honeycomb sizes possible.

In accordance with an added particularly preferred feature of the invention, the supporting pin is rotationally symmetrical, so that a secure fastening in honeycomb bodies, even having different honeycomb shapes, is generally possible with the selection of suitable diameters at both end regions.

In accordance with an additional feature of the invention, the intermediate region of the supporting pin is equipped with a surface that hinders the deposition of soot, which can be achieved, in particular, by using a smooth surface. This means, in particular, that the surface in the intermediate region forms a lower deposition tendency for soot than the end regions and/or commercially available wire. Other deposition-repelling surface treatments are also possible, for example a nano coating.

In accordance with yet another preferred feature of the invention, the supporting pin has a protruding collar between at least one of the end regions and the intermediate region. The collar is also suitable, in particular, for use as a mechanical stop when inserting the supporting pin into a honeycomb of a honeycomb body. Depending on the shaping of the collar, a flow influence protecting the intermediate region against deposits is additionally possible. The collar can be formed over the entire periphery or also only in the manner of a collar piece.

In accordance with yet a further particularly advantageous feature of the invention, if it is assumed that electrically conductive deposits cannot always be prevented entirely, the intermediate region has a structure that lengthens the creepage distance between the first end region and the second end region for electric leakage currents flowing on the surface of the intermediate region. This can be created, in particular, by grooves, undulations and/or thickened portions on the surface, as is known by way of example in the case of high-voltage insulators.

In accordance with yet an added feature of the invention, the use of supporting pins in honeycombs (channels) of a honeycomb body can be facilitated if at least one end region of the supporting pins is pointed. A conical end of an end region adapted in terms of diameter to the size of a honeycomb enables a precise insertion of supporting pins and the creation of suitable contact surfaces for subsequent brazing. A durable unit between supporting pin and honeycomb body can thus be formed.

In accordance with a concomitant feature of the invention, the supporting pin is used, in particular, in a configuration including at least one electrically heatable honeycomb body, which is supported on a first honeycomb body by using a plurality of the supporting pins (at the end face), wherein at least some of the supporting pins, preferably all of the supporting pins, are formed in the manner described herein in accordance with the invention. In this case, it is particularly preferable if the supporting pin is brazed at least at one end region, preferably at both end regions, into a honeycomb of one honeycomb body or both honeycomb bodies.

Other features which are considered as characteristic for the invention are set forth in the appended claims.

Although the invention is illustrated and described herein as embodied in a supporting pin for an electrically heatable honeycomb body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
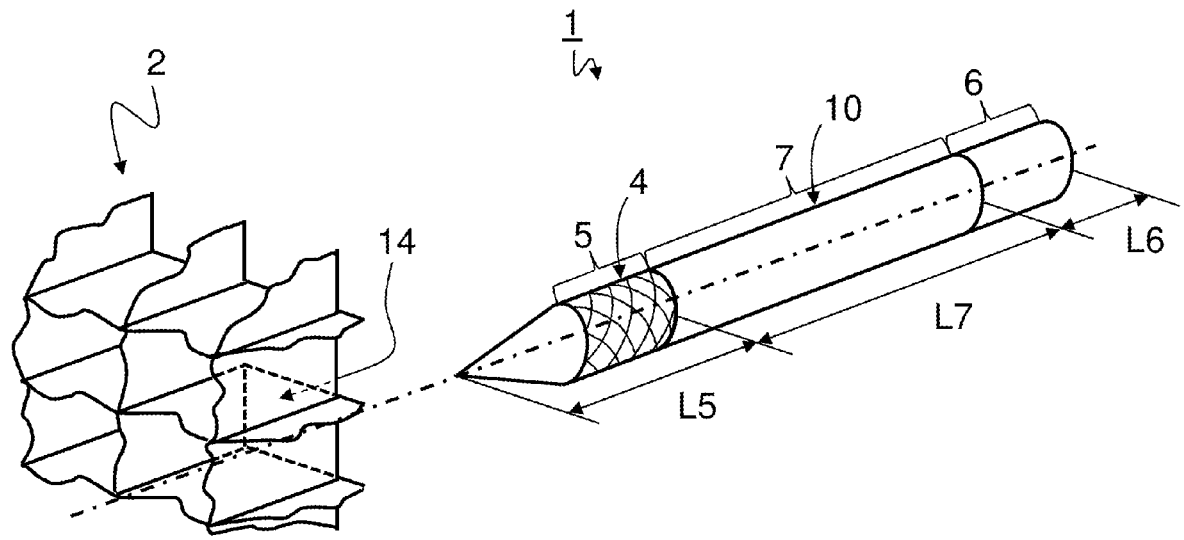
FIG. 1 is a fragmentary, diagrammatic, perspective view of a supporting pin constructed for insertion into a honeycomb body.

Referring now in detail to the figures of the drawings, to which the invention is not limited, and first, particularly, to FIG. 1 thereof, there is seen a diagrammatic illustration of part of a first honeycomb body 2 having honeycombs or channels 14, and a supporting pin 1 according to the invention constructed for insertion into the first honeycomb body 2. This supporting pin 1 is basically formed of ceramic material and has a first end region 5, a second end region 6 and an electrically non-conductive intermediate region 7. At least one end region, in the present case the first end region 5, has a metalized surface 4, so that a subsequent brazing into a metal honeycomb 14 is facilitated. The first end region 5 may be pointed for easier insertion, as in the present exemplary embodiment. A length L7 of the intermediate region 7 is at least 3 mm, preferably 5 to 15 mm, in order to ensure electrical insulation even from voltages up to 48 V or above between the two end regions 5, 6. A length L5 of the first end region 5 and a length L6 of the second end region 6 are dimensioned in such a way that a secure fastening in a first honeycomb body 2 and a non-illustrated electrically heatable honeycomb body is possible.

Figure 2:
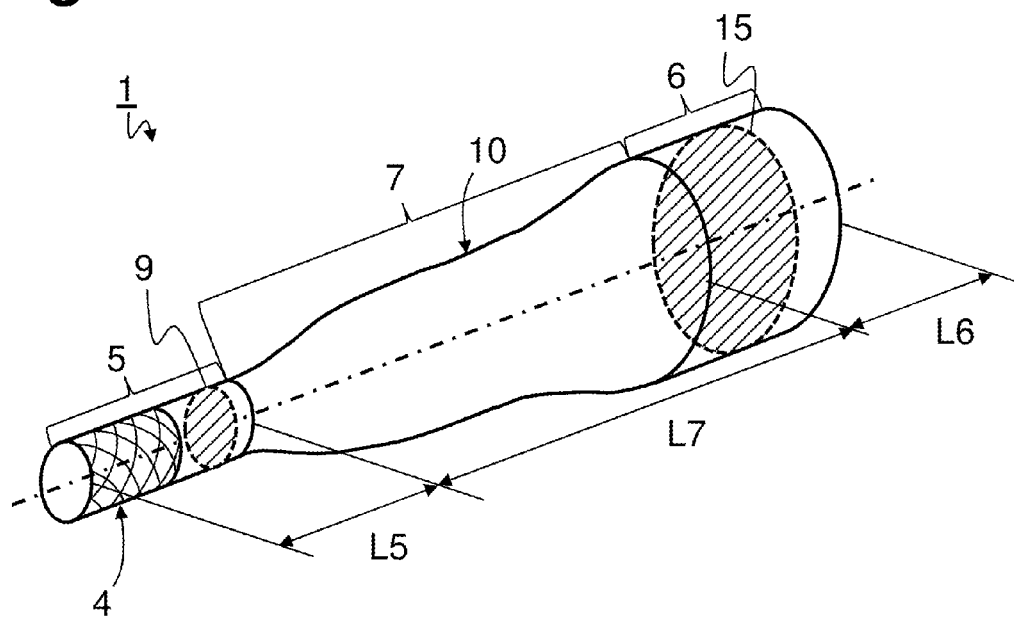
FIG. 2 is a perspective view of a supporting pin having two end regions of different thickness.

FIG. 2 diagrammatically shows an exemplary embodiment of a supporting pin 1 with end regions 5, 6 of different thickness. The first end region 5 again has a metalized surface 4 and a first cross-sectional area 9 that is smaller than a second cross-sectional area 15 of the second end region 6. The intermediate region 7 has a suitable profile or contour of a surface 10 thereof, which produces an adaptation of a shape from the first cross-sectional area 9 to the second cross-sectional area 15. The surface 10 can also be particularly smoothed in order to impair soot deposits.

Figure 3:
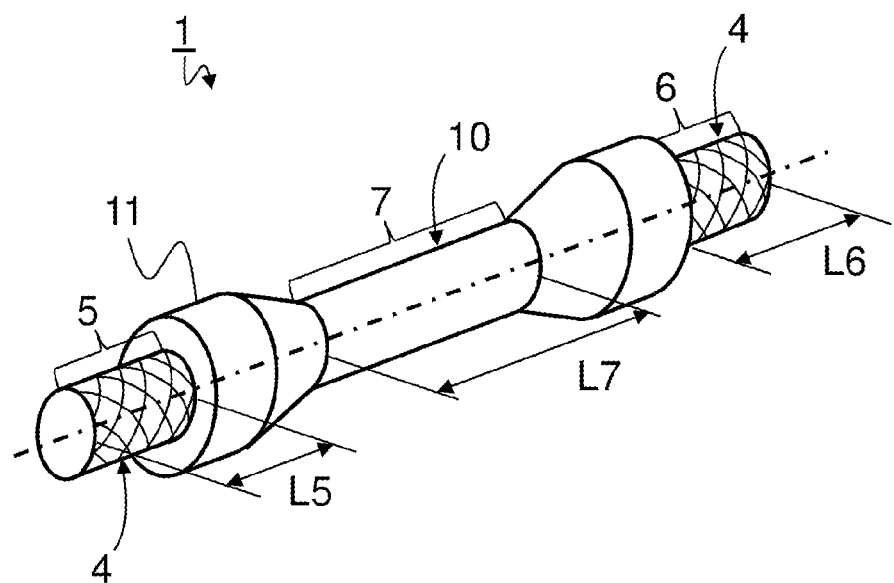
FIG. 3 is a perspective view of a supporting pin with a collar.

FIG. 3 shows a further exemplary embodiment of a supporting pin 1 according to the invention, which has a protruding collar 11 between the first end region 5 and the intermediate region 7. In the present exemplary embodiment the second end region 6 is likewise equipped with a collar, and the entire supporting pin 1 is rotationally symmetrical. The protruding collar 11 is used on the side thereof facing the first end region 5 as a stop when the supporting pin 1 is inserted into a honeycomb body. The region between the protruding collar 11 and the intermediate region 7 can be formed conically, for example, in order to reduce soot deposits in the intermediate region 7.

Figure 4:
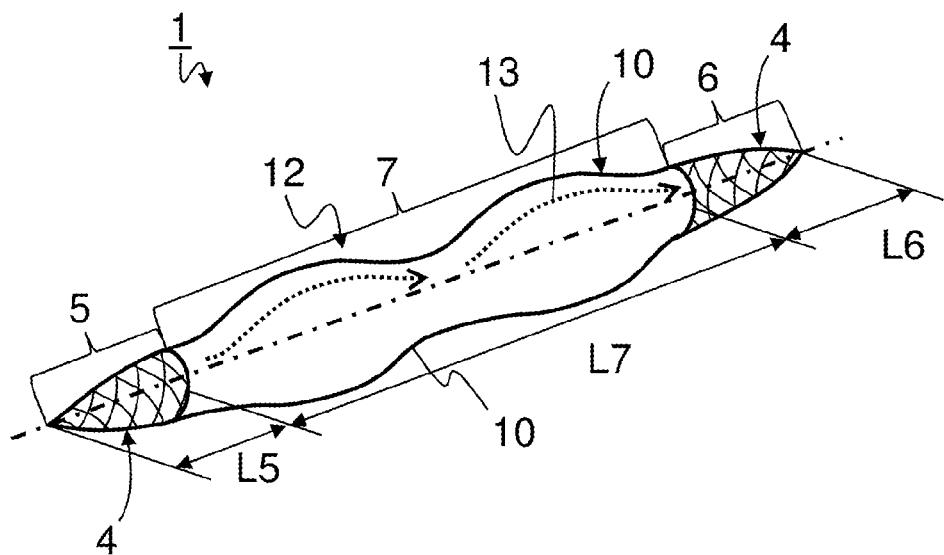
FIG. 4 is a perspective view of a supporting pin with pointed ends and an undulated intermediate region.

FIG. 4 diagrammatically shows a further exemplary embodiment of a supporting pin 1, in which the intermediate region 7 has an undulating structure 12, so that a creepage distance 13 for an electric current from the first end region 5 to the second end region 6 is extended. In the present exemplary embodiment the first end region 5 and the second end region 6 are pointed and equipped with metalized surfaces 4 in order to facilitate an insertion and brazing into honeycomb bodies.

Figure 5:
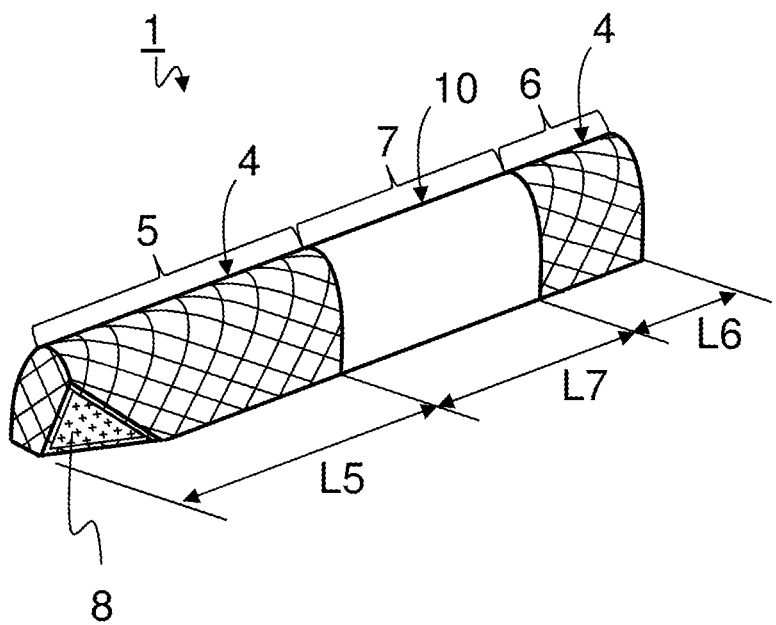
FIG. 5 is a perspective view of a supporting pin adapted in terms of its cross-sectional shape to metal honeycomb bodies.

FIG. 5 shows a supporting pin 1 according to the invention with a cross-sectional shape adapted to its use. Metal honeycomb bodies formed from alternating layers of smooth and undulated sheet metals typical have honeycomb shapes, to which the supporting pins 1 according to the invention can be adapted. This illustrated pin 1 again has a ceramic core 8 and two end regions 5, 6 with metalized surfaces 4.

Figure 6:
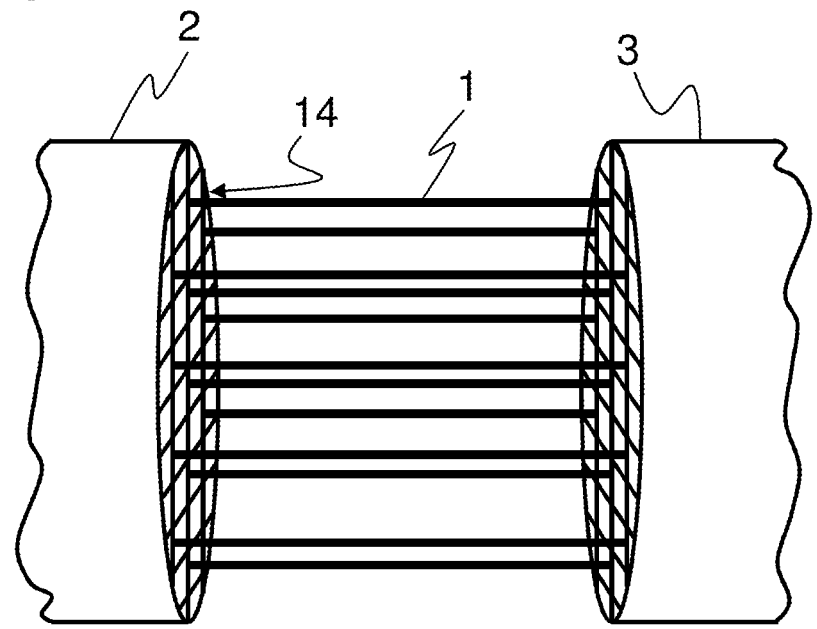
FIG. 6 is a fragmentary, perspective view illustrating the use of supporting pins between a first honeycomb body and an electrically heatable honeycomb body.

FIG. 6 diagrammatically shows a typical use of supporting pins 1 according to the invention between a first honeycomb body 2 and an electrically heatable honeycomb body 3. A number of supporting pins 1 are inserted into the honeycombs 14 of the first honeycomb body 2 and of the electrically heatable honeycomb body 3, where they are preferably brazed in so as to stabilize the entire configuration while simultaneously providing good electrical insulation.

The present invention is particularly suitable for stabilizing electrically heatable honeycomb bodies in exhaust gas treatment systems of internal combustion engines, in particular in motor vehicles. When using higher electric voltages, for example 48 V, for electrically heatable honeycomb bodies, good electrical insulation is thus also ensured in exhaust gas systems carrying soot particles, with simultaneous reliable support and suppression of vibrations.

The invention claimed is:

1. A supporting pin for supporting an electrically heatable honeycomb body at a first honeycomb body, the supporting pin comprising:
    a first end region;
    a second end region;
    an intermediate region being electrically non-conductive and having a length of at least 3 mm;

a core made of electrically non-conductive ceramic material; and a metalized surface on at least one of said end regions.

2. The supporting pin according to claim 1, wherein said metalized surface is disposed on both of said end regions.

3. The supporting pin according to claim 1, wherein said end regions have cross-sectional areas, and said cross-sectional area of said first end region is smaller than said cross-sectional area of said second end region.

4. The supporting pin according to claim 1, wherein the supporting pin is rotationally symmetrical.

5. The supporting pin according to claim 1, wherein said intermediate region has a surface configured to impair soot deposition.

6. The supporting pin according to claim 1, which further comprises a protruding collar disposed at least between one of said end regions and said intermediate region.

7. The supporting pin according to claim 1, wherein said intermediate region has a surface, and said intermediate region has a structure lengthening a creepage distance between said first end region and said second end region for electric leakage currents flowing on said surface of said intermediate region.

8. The supporting pin according to claim 7, wherein said structure has a shape at least having undulations, grooves or thickened portions.

9. The supporting pin according to claim 1, wherein at least one of said end regions is pointed.

10. The supporting pin according to claim 1, wherein at least one of said end regions is configured to be brazed into a honeycomb of a honeycomb body.

\* \* \* \* \*